United States Patent [19]
Bella

[11] Patent Number: 5,765,098
[45] Date of Patent: Jun. 9, 1998

[54] METHOD AND SYSTEM FOR TRANSMITTING RADIO SIGNALS BETWEEN A FIXED TERRESTRIAL STATION AND USER MOBILE TERMINALS VIA A NETWORK OF SATELLITES

[75] Inventor: Luigi Bella, Noordwijk-aan-Zee, Netherlands

[73] Assignee: Agence Spatiale Europeenne, Paris, France

[21] Appl. No.: 676,802

[22] Filed: Jul. 8, 1996

Related U.S. Application Data

[63] Continuation of Ser. No. 581,193, Dec. 29, 1995, abandoned.

[30] Foreign Application Priority Data

Jan. 2, 1995 [FR] France ................... 95 00008

[51] Int. Cl.$^6$ .................................................. H04B 7/185
[52] U.S. Cl. .................... 455/13.3; 455/428; 455/429; 370/319
[58] Field of Search ..................... 455/12.1, 13.1, 455/13.2, 13.3, 25, 33.1, 62, 63, 428, 429, 430; 342/352; 370/319, 320

[56] References Cited

U.S. PATENT DOCUMENTS

| | | | |
|---|---|---|---|
| 5,161,248 | 11/1992 | Bertiger et al. | 455/33.2 |
| 5,483,664 | 1/1996 | Moritz et al. | 455/428 |
| 5,559,806 | 9/1996 | Kurby et al. | 455/13.3 |
| 5,574,968 | 11/1996 | Olds et al. | 455/428 |
| 5,621,415 | 4/1997 | Tuck | 455/13.3 |

*Primary Examiner*—Edward F. Urban
*Attorney, Agent, or Firm*—Sughrue, Mion, Zinn, Macpeak & Seas, PLLC

[57] ABSTRACT

The invention concerns a method and a system for transmitting radio signals between a fixed terrestrial station and mobile user terminals via a network of satellites in inclined circular orbits having a radius less than that of geostationary orbits. The beams generated are divided into pencil beams each associated with a continuous sub-band of frequencies in increasing frequency or decreasing frequency order. The instantaneous transmission frequency is offset progressively during the call towards the frequency subband of the adjacent pencil beam, at a rate proportional to the orbital rotation speed, to enable switching between pencil beams or between satellites. Applications include transmission via satellites in non-geostationary orbit.

22 Claims, 6 Drawing Sheets

FIG_2a

FIG_2b

FIG_4a

FIG_4c

FIG_4b

FIG_5a

FIG_5b

FIG_6

FIG_7

FIG_8 Frequency variation above a fixed point on the terrestrial globe

FIG_9 Frequency bands allocated to users

FIG_10

METHOD AND SYSTEM FOR TRANSMITTING RADIO SIGNALS BETWEEN A FIXED TERRESTRIAL STATION AND USER MOBILE TERMINALS VIA A NETWORK OF SATELLITES

This is a continuation of application Ser. No. 08/581,193 filed Dec. 29, 1995, now abandoned.

BACKGROUND OF THE INVENTION

1. Field of the invention

The present invention concerns a method of transmitting radio signals between a fixed terrestrial station and user mobile terminals via a network of satellites.

It also concerns a transmission system implementing the method.

In the context of the invention, the expression "fixed terrestrial station" means a terminal station for international traffic or a similar installation; the installation can be connected to terrestrial communication networks and/or to other stations of the same type by terrestrial or satellite links.

Similarly, the term "mobile terminal" encompasses many types of terminal, in particular portable terminals, for example pagers.

2. Description of the prior art

There already exist many satellite communication systems providing fixed or mobile services. The approaches adopted for fixed and mobile services are highly divergent, in terms of frequency band (L or S band in one case, C, Ku or Ka in the other), capacity (a few Mbit/s in one case, hundreds of Mbit/s in the other), coverage (global or regional in one case, global by spot, regional or national beams in the other) or terminal size and capacity (from one meter to a few centimeters with a data rate of a few kbit/s in one case to 17 meters to 1 meter with a data rate in the order of a few Mbit/s to a few hundred Mbit/s).

The recent trend in satellite networks for mobile services is to use satellites in low earth orbit (LEO) or medium Earth orbit (MEO). These satellites can provide service to portable terminals using omnidirectional antennas, usually for very highly compressed voice transmission. Satellite networks for fixed services continue to use satellites in geostationary orbit (GEO). They are more particularly intended for trunk or private traffic (leased networks) and use high bit rate networks.

The "low bit rate" sector of the satellite communication market (dish antennas with a diameter of less than 1 meter) is concerned with briefcase-size units and major effort has been put into producing portable terminals at low cost. However, this market sector leaves completely untouched a segment for mobile terminals offering higher performance, namely broadband portable terminals. There is seen to be an increasing need for this service, which falls between the conventional "fixed" and "mobile" satellite communication services. The new market would seem also to be able to meet new demands for "broadband mobile communications". It is well known that, at least in the short term, the terrestrial cellular networks will not be able to offer communication at bit rates in excess of 16 kbit/s.

Consideration may also be given to high-performance telephone and facsimile terminals, for example in remote countries without an adequate terrestrial infrastructure: communication "mini-node", etc.

It is therefore necessary to develop a satellite communication system with worldwide coverage, calling for a reasonable initial investment, but offering high performance (typically at least 64 kbit/s, with low transmission delay) for terminals the size of a pocket calculator using a fold-out antenna. Also, the system must not necessitate lengthy coordination procedures before it goes into operation. Finally, the system must not interfere with other satellite systems, in particular geostationary satellite systems.

The method and the system of the invention are directed to meeting these requirements simultaneously, whilst also alleviating the drawbacks of the prior art.

To this end, the "terrestrial" segment of the system of the invention is made up of a large number of broadband portable user terminals and satellite control stations, preferably duplicated.

The "space" segment consists in a network of medium Earth orbit (MEO) satellites controlled by the aforementioned stations via telemetry, tracking and control (TT&C) stations. The control stations can be linked to international traffic terminal stations. The orbits are circular and inclined, with a nodal period of 8 sidereal hours (i.e. triply geosynchronous). The satellites of the aforementioned network systematically repeat the same track across the Earth every 24 hours, as explained in the article by J. MASS: "Triply Geosynchronous Orbits for Mobile Communications" in "15th AIAA Conference on Communication Satellite Systems"", San Diego, 1994, pages 1220–1226. The satellites, of which there are at least six but preferably seven, must also meet a number of additional criteria, as explained below.

The user portable terminals can be in their active mode when the antenna is deployed and controlled by an appropriate control station via a "control link", or in their passive mode, in which they can only be called (paged).

An important feature of the invention is the use of scanning antennas on the satellites and in the portable terminals. Also, in a preferred embodiment the global frequency band is divided into narrow beams in contiguous sub-bands. Hereinafter these narrow beams are called "pencil beams". The portable terminals therefore require a very simple mode of switching automatically between pencil beams, without blocking, even though the satellite is moving. In one preferred embodiment all that is required is to command scanning of the antenna, for example, frequency scanning. In this embodiment the frequency used for the communication link is varied progressively.

Switching from one satellite to the other is effected by a similar method. In a preferred embodiment, two consecutive satellites scan the same coverage area using pencil beams whose frequency sub-bands are in the opposite order. This allows a given terminal to remain in the same frequency sub-band at the time of changing from one satellite to the other.

Finally, measures are taken to minimize interference with existing systems operating in the same frequency bands, in particular geostationary satellite systems.

SUMMARY OF THE INVENTION

Accordingly, the invention consists in a method of transmitting radio signals via a satellite network between at least one fixed terrestrial station and user terminals, the satellites rotating about the terrestrial globe in a circular orbit and at a particular speed, the orbits being inclined to the equator and having a radius less than that of geostationary orbits, the satellites being triply geosynchronous, each satellite comprising an arrangement of antennas for generating at least one beam with a radiation pattern directed towards the surface of the terrestrial globe and associated with a band of frequencies of particular bandwidth, the method comprising at least the following steps:

dividing said beam into a particular number of contiguous pencil beams each associated with a frequency sub-band which is a subdivision of said particular bandwidth;

setting up a communication link in at least one direction between one of said terrestrial terminal stations and one of said user terminals via one of said satellites of the network using an instantaneous transmission frequency in a first frequency sub-band associated with a first pencil beam illuminating said user terminal when the latter is overflown by this satellite; and progressively shifting said instantaneous transmission frequency during the period of the communication link towards the next frequency sub-band associated with the adjacent pencil beam and at a rate proportional to said particular rotation speed so as to compensate said rotation and to enable tracking of said satellite.

The invention also consists in a system for transmitting radio signals between a fixed terrestrial station via a network of satellites using the above method.

The method and the system implementing the method reduce the number of satellites required, offer high capacity, especially in terms of bit rates, and reduce the complexity of the equipment on board the satellites and the equipment of the portable terminals. In particular, there is no need for switching between satellites and switching procedures in the portable terminals are minimized.

The invention will be more clearly understood and other features and advantages of the invention will emerge from a reading of the following description given with reference to the appended drawings.

DETAILED DESCRIPTION OF THE PREFERRED EMBODIMENTS

The method of the invention will now be described in detail.

As already mentioned, the terrestrial segment comprises a large number of broadband portable user terminals and satellite control stations.

Figure 1A:
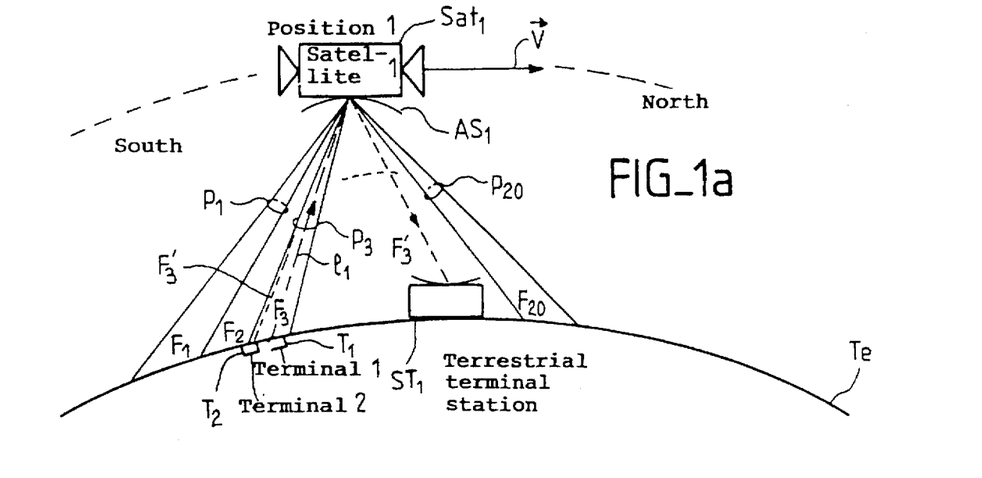
FIGS. 1a and 1b are diagrams showing transmission of radio signals between a fixed terrestrial station and portable terminals via a satellite network using the method of the invention.
Figure 1B:
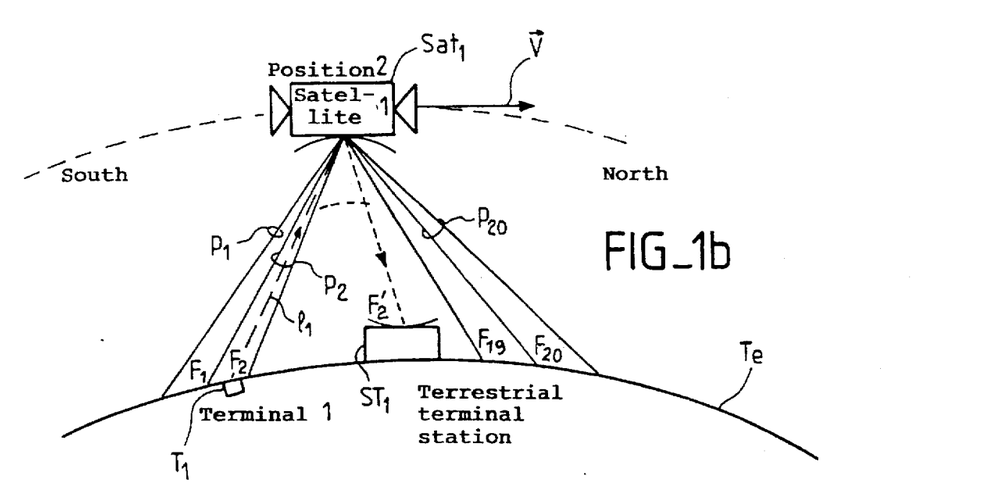

FIGS. 1a and 1b are diagrams showing the transmission of radio signals via a network of satellites between a fixed terrestrial terminal station $ST_1$ and mobile user terminals, only two of which: $T_1$ and $T_2$, are shown. The system can naturally include a plurality of terrestrial stations. It also includes telemetry, tracking and control stations. These aspects are well known in themselves and there is no point in describing them further.

Although only one satellite Sat1 is shown, it is clear that to provide continuous coverage over a given region of the earth, since the satellites are not geostationary, it is necessary to provide several satellites, preferably six to eight satellites. The precise specifications of the orbits and the resulting terrestrial coverage are explained below. Briefly, the orbits are circular and inclined with a nodal period of 8 sidereal hours (triply geosynchronous). The same track on the terrestrial surface is repeated every 24 hours. This aspect is explained in the article by J. MASS previously referred to.

It can be shown that optimum coverage of land masses can be obtained if appropriate orbital parameters are adopted, for example:

inclination: 75°;
ascending node: 30°;
mean anomaly: 0°.

In this case the minimum elevation angle is between 20° and 30° for a network of six to eight satellites.

The mobile link can be in the Ku or Ka band. To give a concrete example, without this being in any way limiting on the scope of the invention, it is assumed hereinafter that the Ka band is used. The communication links (link $1_1$ for example) are set up on demand for the required bandwidth, which is typically from 16 kbit/s to 2 Mbit/s, for example, between any active user portable terminal (for example $T_1$) and an appropriate terrestrial control station or international traffic terminal station, for example $ST_1$. The latter station $ST_1$ then routes the call via an appropriate public or private network to the required final destination. The station $ST_1$ then sets up the reverse routing of incoming "calls" via terrestrial networks to the user portable terminals $T_1$ or $T_2$. These terminals can be connected by a double hop and one (or more) transit(s) via terrestrial stations, for example $ST_1$. However, the transit times are nevertheless shorter than those permitted in the case of geostationary satellites.

The "call" channels can be conventional connections based on switched physical circuits or, in the case of satellite links, these "call" channels can be virtual channels, for example in an asynchronous transfer mode (ATM) asynchronous multiplex transmission type system.

For example, each satellite can offer a capacity equivalent to around one thousand 64 kbit/s full duplex circuits with a simple transparent repeater carrying out direct frequency conversion. Each satellite, for example $Sat_1$, communicates with the user portable terminals, for example $T_1$ or $T_2$, using one scanning antenna arrangement to receive and another scanning antenna arrangement to transmit. For simplicity only the receive antenna arrangement $AS_1$ has been shown.

In accordance with one aspect of the invention, each of the antennas generates a particular number of pencil beams, for example 20 pencil beams $p_1$ through $p_{20}$, of highly elliptical cross-section. It is assumed hereinafter, without this being in any way limiting on the scope of the invention, that the major axis of the ellipse is orthogonal to the velocity vector v of the satellite $Sat_1$. It is also assumed that the satellite is moving South to North across the surface of the Earth $T_e$.

The footprints of the transmit and receive beams are similar. It is assumed that these beams have crossed (orthogonal) polarizations and occupy frequency bands of substantially the same width.

An important feature is that the global frequency band (typical 500 MHz) is divided between the various (for example 20) pencil beams $p_1$ through $p_{20}$ producing sub-bands $F_1$ through $F_{20}$. Finally, it is assumed that each pencil beam is in a specific sub-band contiguous with the sub-band of the adjacent pencil beam (25 MHz sub-bands in this example).

Using this arrangement and modifying the frequency in accordance with a law proportional to the angular velocity v of the satellite $Sat_1$, it is possible to obtain automatic switching between pencil beams, without blocking, even though the satellite $Sat_1$ is moving continuously.

In FIG. 1a, for example, the user portable terminal $T_1$ operates in the frequency sub-band $F_3$ when the satellite $Sat_1$ is at position 1. The link $1_1$ is set up when the terminal $T_1$ is in the footprint of the pencil beam P3 corresponding to this sub-band $F_3$. The operating frequency is then progressively modified towards the frequencies of the frequency sub-band $F_2$. The satellite $Sat_1$ is assumed to be moving South to North. The frequency bands associated with the pencil beams $P_1$ through $p_{20}$ are in the order $F_1$ through $F_{20}$ from South to North (in this example). The sub-band $F_2$ and the pencil beam $p_2$ corresponding to that sub-band may be reached during the transmission.

. Note that these arrangements do not presuppose any data processing on board the satellites, for example the satellites $Sat_1$, but merely simple variation of the frequency used at the terrestrial station $ST_1$ during the period of the link $1_1$ between it and the terminal $T_1$.

The terminal $T_1$ must naturally be able to track these received frequency variations and to transmit on this instantaneous frequency. This type of switching does not require any high-level procedure that is complex to implement and is strictly non-blocking.

The procedure for switching the radiation pattern of the same satellite, in this example the satellite $Sat_1$, between pencil beams $p_1$ to $p_{20}$ has just been described. However, when the terminal $T_1$ is in the last pencil beam $p_{20}$ from the satellite $Sat_1$, the associated sub-band of which is $F_1$, if the call in progress has not finished it is necessary to switch from this pencil beam to the first pencil beam of the next satellite, i.e. the satellite $Sat_2$. If the frequency sub-bands are distributed in exactly the same way as those of the satellite $Sat_1$, it would be necessary to jump suddenly from sub-band $F_1$ to sub-band $F_{20}$.

In a preferred embodiment of the invention the sub-bands of the satellite $Sat_2$ are in the opposite order, i.e. from frequency sub-band $F_{20}$ through frequency sub-band $F_1$ from South to North (in this example).

Figure 2A:
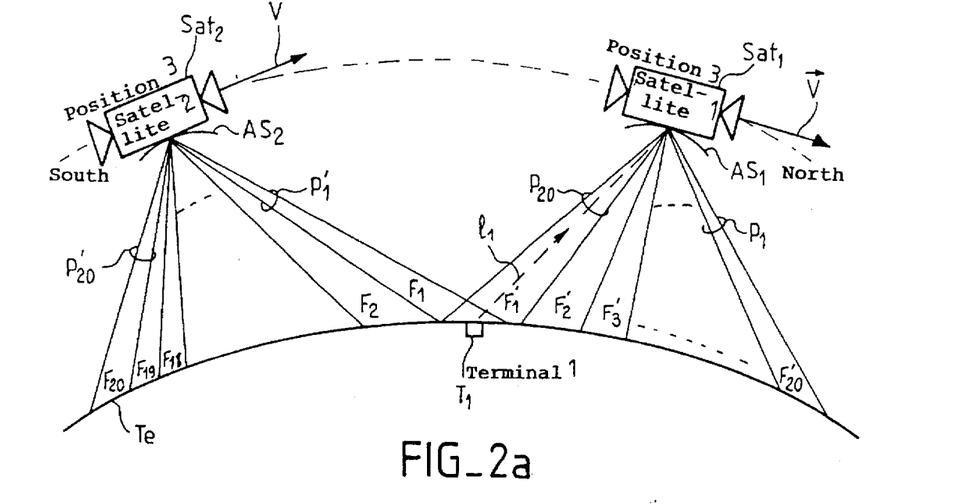
FIGS. 2a and 2b show switching between two consecutive satellites.
Figure 2B:
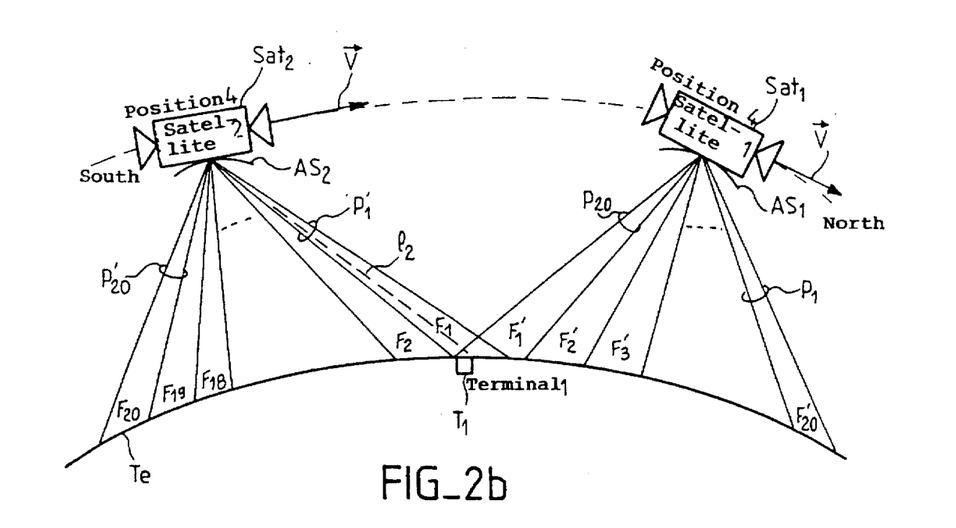

FIGS. 2a and 2b are diagrams showing switching between two consecutive satellites $Sat_1$ and $Sat_2$. To simplify the drawings the terrestrial stations are not shown. The pencil beams $p'_{20}$ through $p'_1$ correspond to the respective sub-bands $F_1$ through $F_{20}$.

In FIG. 2a the satellites $Sat_1$ and $Sat_2$ are shown at position 3 as they rotate about the Earth $T_e$ from South to North at the speed v. The terminal $T_1$ is in the footprint of the last pencil beam $p_1$ of the satellite $Sat_1$ and is operating in the frequency sub-band $F_1$ (link 11). The first pencil beam $P'_{20}$ of the satellite $Sat_2$ can overlap wholly or partly the last pencil beam $p_1$ of the satellite $Sat_1$.

As the frequency sub-bands associated with the respective pencil beams $p_1$ and $p'_{20}$ are identical, switching between the two satellites $Sat_1$ and $Sat_2$ is easy. It can be progressive, the terminal $T_1$ being able to receive signals from both satellites $Sat_1$ and $Sat_2$, as explained below.

In FIG. 2b the satellites $Sat_1$ and $Sat_2$ are shown at position 4 as they rotate about the Earth $T_e$. The link 12 is thereafter exclusively between the terminal $T_1$ and the satellite $Sat_2$. The operating frequency is then progressively modified towards the frequencies of the frequency sub-band $F_2$ (and so on, to $F_3$, etc).

To prevent interference between pencil beams and to facilitate switching, the access mode (transmit or receive) in each sub-band can be, and this is by way of example and therefore not limiting on the scope of the invention, the synchronous CDMA (Code-Division Multiple Access) mode. At the level of the satellites, for example Sat1, the mode is "V-FDM-COMA" i.e. variable frequency-division multiplex CDMA between pencil beams and CDMA within each pencil beam, i.e. within a frequency sub-band, for example $F_1$. The CDMA mode allows efficient processing of virtual channels in asynchronous transfer mode (ATM). Also, in FDM a great variety of bit rates can be handled using different process gains. The FDM mode can be replaced by an equivalent mode, such as the TDM mode or spread spectrum time-division multiplexing for the downlink (terminal station $ST_1$ → satellite $Sat_1$ → terminal $T_1$, see FIGS. 1a and 1b), if necessary, for example to facilitate frequency acquisition and tracking.

Figure 3:
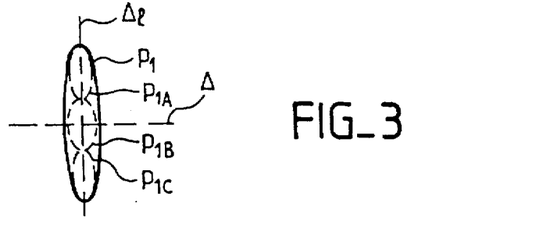
FIG. 3 shows a detail of transmission beams of the invention.

The coverage area of each pencil beam can be divided into sub-pencil beams, of which there are three, for example, as shown in FIG. 3. Each pencil beam, for example $P_1$, is divided into three sub-pencil beams $P_{1A}$ through $P_{1C}$ aligned with the major axis $\Delta_1$ of the ellipse that form the cross-section of each pencil beam. As already mentioned, the axis $\Delta_1$ is orthogonal to an axis $\Delta$ (the minor axis of the ellipse) parallel to the speed vector V. Each series of sub-beams, for example $P_{1A}$ through $p_{20A}$, can be generated by separate scanning antennas disposed in parallel, all operating in exactly the same way.

This arrangement is particularly beneficial for the satellite-ground link to increase the antenna gain, reduce the power consumption of the onboard electronics and reduce the spectral power density interfering with geostationary systems.

Another improvement is to restrict the pencil beams and sub-pencil beams to a single active user, i.e. to customize frequency scanning to the user. Referring again to figure 1a, this amounts to using a slightly different center frequency ($F'_3$) of the sub-band for the spread spectrum of the terminal $T_2$, for example, although the same frequency scanning procedure is applied to this terminal $T_2$.

This improvement does not complicate or even modify the on-board antenna, but offers a saving of around 3 dB in the link balance and makes frequency tracking by user mobile terminals totally smooth.

It is naturally necessary to use a more refined frequency synchronization per user, but any complexity that results from this is restricted to the terrestrial terminal stations.

Note also a slight deterioration due to imperfect overlap of the CDMA spectra that are no longer completely synchronous. However, near users (for example $T_1$ and $T_2$ in FIG. 1a) are quasi-synchronous and distant users can be discriminated by different antenna gains at separate frequencies, leading to inherent noise rejection performance between those of synchronous and asynchronous CDMA modes.

Figure 4A:
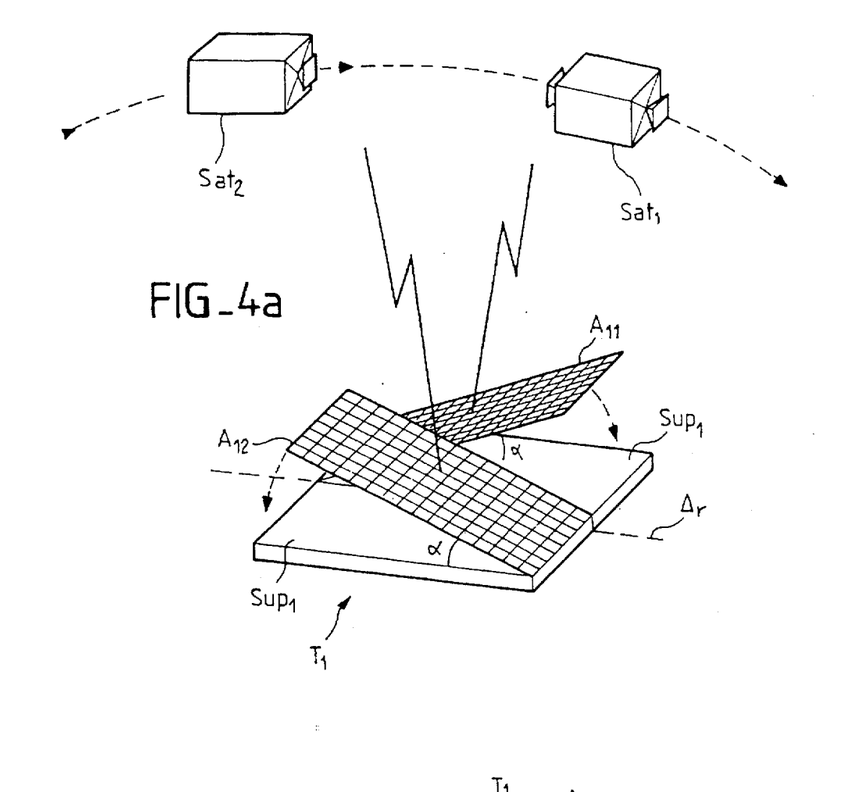
FIGS. 4a through 4c are diagrams showing one example of the arrangement of portable terminal antennas in the deployed and folded positions, respectively.
Figure 4B:
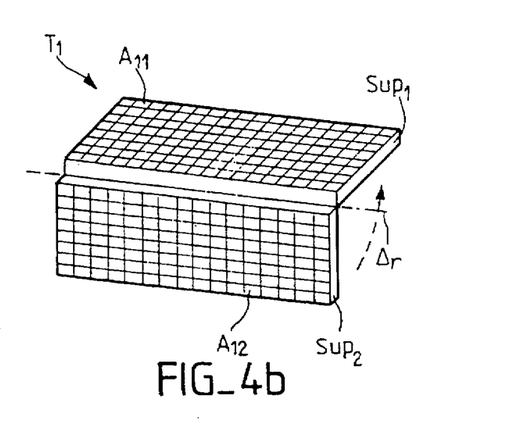
Figure 4C:
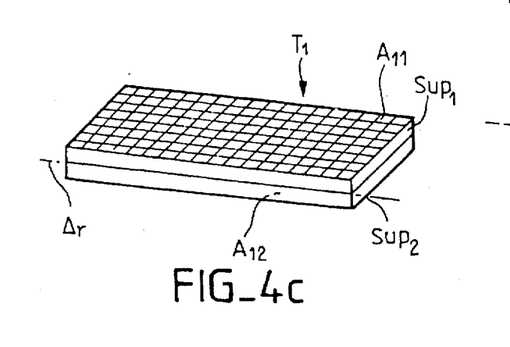

As the satellite moves around its orbit, the user mobile terminals must track the transmit or pencil beam. FIGS. 4a through 4c are diagrams showing one embodiment of a terminal with its antenna.

The terminal comprises two plane scanning antennas $A_{11}$ and $A_{12}$ on respective supports $Sup_1$ and $Sup_2$. These supports can be the enclosures for the usual signal receiving, transmitting and processing electronic circuits.

In FIG. 4a the terminal $T_1$ is shown in active mode, i.e. with its antennas $A_{11}$ and $A_{12}$ deployed.

Given these arrangements, the satellite can be tracked in a plane, with very low error, rather than in a volume. This plane is simply determined if the characteristics of the satellite orbits (which are repetitive), the time of day and the position of the mobile user terminal on the surface of the terrestrial globe $T_e$ are known. Computation circuits that are well known in themselves can be used for this purpose.

Each antenna $A_{11}$ and $A_{12}$ is aligned with a direction orthogonal to the plane of the antenna. The surfaces of the two supports $Sup_1$ and $Sup_2$ form a single plane and the antennas $A_{11}$ and $A_{12}$ are inclined at the same angle α to this single plane.

In accordance with one advantageous aspect of the invention, each antenna $A_{11}$ and $A_{12}$ is connected to separate transmit and receive circuits.

Figure 5A:
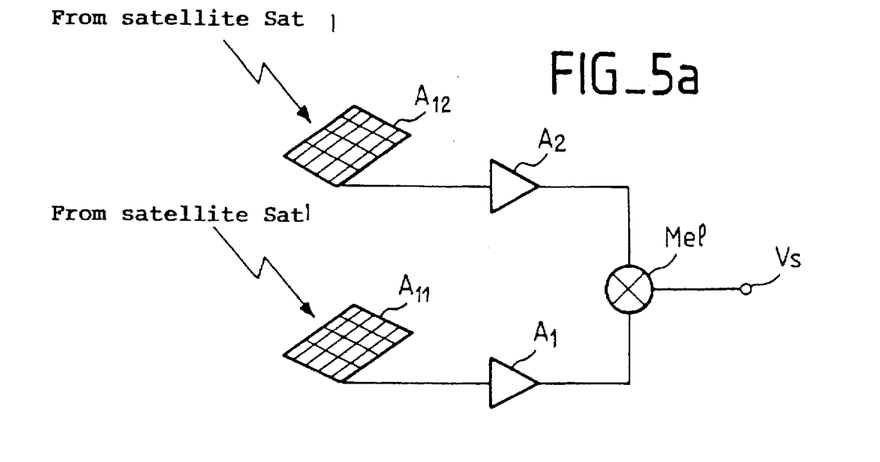
FIGS. 5a and 5b show two reception modes of user mobile terminals.

Considering first "receive" mode, there are two cases to be considered:

If the satellite, for example $Sat_1$ (see FIG. 1a or 1b), is substantially at the zenith, the two antennas $A_{11}$ and $A_{12}$ receive the same signal from the same satellite $Sat_1$. FIG. 5a shows this situation. The received signals are transmitted to the inputs of two of the usual input circuits, shown as respective amplifiers $A_1$ and $A_2$. Each channel can be used separately, but the signals can advantageously be combined by a mixer circuit Mel to obtain an output signal $V_S$ of better quality. This combination is effected at the demodulator level. The signal $V_S$ is then processed in the manner that is known in itself.

Figure 5B:
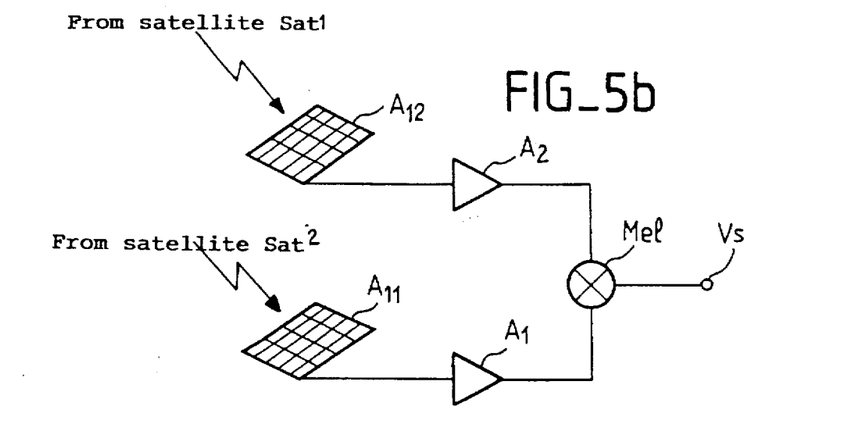

On switching between contiguous satellites (see FIGS. 2a and 2b), each antenna $A_{11}$ and $A_{12}$ receives the same signal, in terms of its content, but from different satellites. In the example shown in FIG. 5b the antenna $A'_{11}$ receives the signal from the satellite $Sat_1$ and the antenna $A_{12}$ from the satellite $Sat_2$. The two transmission links $1_1$ (see FIG. 1b, for example) and $1_2$ (see FIG. 2b, for example) are under the control of the same terminal terrestrial station, for example $ST_1$ (FIGS. 1a and 1b). The receive power is combined by the circuit Mel, as previously. This technique is known as "diversity" and can be used in CDMA mode. In this way switching between satellites is effected without discontinuity.

A similar procedure can be used for transmission. Two power amplifiers (antenna drive amplifiers) are required in the terminal.

As it is necessary to track the satellite(s) only in one plane, rather than in three dimensions, it is possible to optimize the configuration of the antenna, or more precisely the antennas of the user mobile terminals. In particular it is possible to minimize scanning losses and to obtain a radiation pattern allowing easy switching between pencil beams of the same satellite (for example $Sat_1$) or different satellites (for example, in FIG. 2b or 4a: $Sat_1$ to $Sat_2$).

The antenna can be folded when the terminal $T_1$ goes from the active mode to the passive mode.

FIGS. 4b and 4c show two steps of folding the antennas $A_{11}$ and $A_{12}$. First the antennas are folded in the single plane formed by the upper faces of the supports $Sup_1$ and $Sup_2$. The latter can then be folded about a hinge axis $\Delta_r$ (FIG. 4b) until they come together back-to-back and locked in this position (FIG. 4c). Mechanical members well known in themselves: hinges, etc, can be used to achieve this result.

In the passive mode the user mobile terminals, for example $T_1$, can only be called (paged). The same CDMA multiplexing procedure can be used, either via partial use of the folded plane antennas $A_{11}$ and $A_{12}$ or with the aid of an auxiliary antenna (not shown).

As already mentioned, correct deployment is simple if the orbital characteristics of the satellites in the network are known. This data can be pre-stored in tables (in programmable memory or PROM, for example). It is also necessary to know, at least approximately, the time of day and the location of the terminal $T_1$.

An initial procedure (using the above information: time of day, location and/or radio data signals from the satellites) provides fine adjustment of the orientation, the operating frequency and the creation of a signalling channel within the CDMA band (associated with a low data rate per user).

There are many solutions to the problem of tracking the terrestrial terminal station from the satellites: mechanically steered reflector, phased array antenna, multiple feed arrangement using a Butler matrix or another type of frequency scanning antenna. An autonomous tracking and switching procedure similar to that of the terminals can be used.

In a preferred embodiment each terrestrial terminal station (for example $ST_1$, FIGS. 1a and 1b) comprises at least one dual antenna (for example two dishes) for each satellite orbit that can be seen. This arrangement allows more gradual switching. Each station is responsible for the correct allocation of communication channels in the sub-band (i.e. the pencil beams and frequencies, including frequency scanning to compensate the orbital movement of the satellites), and in the subbands, appropriate CDMA codes for the initialization procedures and signalling channels for the user mobile terminals. They are also responsible for connection to public or private networks, administration of location of terminals in active mode and traffic characteristics, in conjunction with other terminal stations, and all other functions necessary for correct operation.

As is well known, one of the major problems encountered with satellite systems in lower orbits than geostationary satellites is that of interference and coordination with the other systems, both geostationary and non-geostationary.

In the case of similar systems of non-geostationary satellites, it is sufficient to use different satellite orbit phases and/or different tracks on the Earth.

In the case of geostationary satellites operating in the same frequency bands, it is necessary to control mutual interference in the manner explained below.

As already mentioned, one aim of the system of the invention is to solve this problem.

In the case of geostationary systems, the most critical situation is naturally that of interference by very high power downlink (satellite-Earth) signals reaching terminals cooperating with the geostationary satellites. The equivalent isotropic radiated power (EIRP) is very high since the need is to communicate with very small portable terminals having antennas that, even when deployed, have a very small surface area. Also, because of the lower altitude than geostationary satellites, the signals suffer less attenuation.

Figure 6:
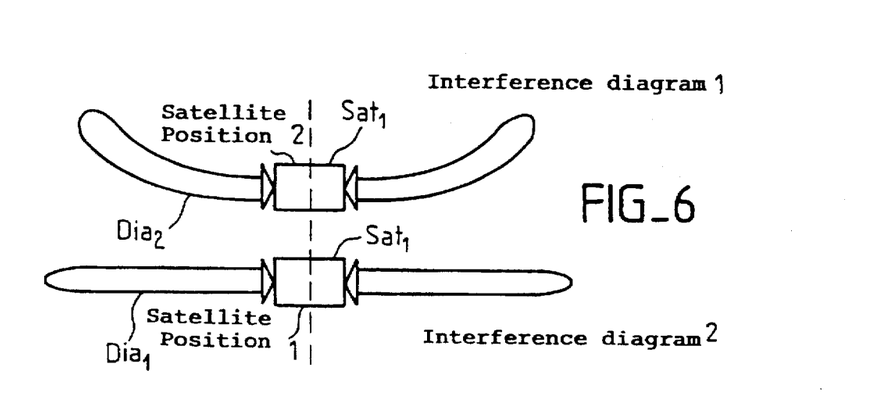
FIG. 6 shows two interference diagrams in the case of interference with a geostationary satellite transmission system.

Note, however, that the satellites of the system of the invention cause interference over only a very limited part of their orbit (near the equator, typically between −9° latitude and +9° latitude) and with an interference diagram that is substantially banana shaped, as shown in FIG. 6. This latter figure shows two interference diagrams Dia1 and Dia2 for two separate positions of a satellite, for example satellite $Sat_1$. The thickness of the banana shape depends on various parameters including receive performance off the greatest sensitivity receive axis of the terminals (of the geostationary system) and the signal level (power spectral density) of the system of the invention compared to the nominal signal from geostationary satellites.

Given that the banana-shape interference diagram is very similar to the footprints of the pencil beams and that the larger they are the faster they move (i.e. on approaching the previously mentioned ±9° latitude), very simple but effective countermeasures can be adopted to prevent unwanted interference diagram. The simplest is to eliminate the pencil beam(s) corresponding to the banana shape interference diagram. The positions of the pencil beams are known a priori since they depend on the instantaneous position of the satellite, which is naturally known at all times. The elimination of the pencil beams in question is a simple operation, given the frequency scanning characteristics of the satellite antenna. All that is required is to interrupt the frequency sub-band corresponding to the pencil beams to be eliminated in the terrestrial terminal station (for example $ST_1$) controlling the satellite(s).

The relevant publications of the international standards organizations include:

ITU-R Recommendation 580-2,

ITU-R Special Committee Results on Coordination between Geostationary and Non-Geostationary Satellite Systems.

Given the above work on standardization and the interference resistant properties of the CDMA mode, the duration of such interruption in the worst case scenario i.e. for a continuous ring of satellite along a geostationary arc, all operating in the same frequency band as the satellites of the system of the invention, would be around two to three minutes every two hours (it is also probable that the signalling channel would nevertheless remain active). The resulting unavailability (approximately 2%) is comparable with the unavailability due to attenuation caused by rain fall (approximately 1%) and much better than the unavailability due to masking that is tolerated in the case of terrestrial mobile systems.

The above hypotheses have been adopted for a system of six to eight satellites. Interference could be entirely avoided by using a greater number of satellites: for example 10 to 15.

Another way to solve the interference problem is based on the fact that, in each area, only one sub-set of frequency sub-bands can interfere with geostationary satellite systems (only the sub-bands corresponding to a scanning angle at which the banana-shape interference diagrams are generated, i.e. when the satellite is between −9° latitude and +9° latitude). Frequency coordination could be limited to this set of sub-bands, which can be chosen in the least critical part of the spectrum (for example at the margin of the band allocated to the geostationary transponders or allowing for the current real position of the coordinates of the satellite and the frequencies instead of the above pessimistic hypothesis, i.e. a continuous ring of satellites).

Other methods and/or combinations of methods can equally well be used.

The various parameters associated with the satellites of the network constituting the space segment of the system will now be explained in more detail.

As already mentioned, the orbits are circular and inclined with a nodal period of 8 sidereal hours (28721") (triply geosynchronous). The same track on the terrestrial surface is repeated every 24 hours. However, it is necessary to adopt a slightly shorter orbital period to compensate longitudinal drift of the ascending node.

Optimum coverage of land masses is obtained if appropriate orbit parameters are adopted, for example:

inclination: 75°, ascending node: 30°, mean anomaly: 0°, orbital period: approximately 28714" (instead of the theoretical 28721"), altitude: 13 901 km.

In this case the minimum elevation angle is between 20° and 30 ° (for a network of six to eight satellites).

The (for example six minimum) satellites of the network are naturally regularly spaced in orbit. However, since the satellites as a whole have an apparent serpentine movement, as seen by a terrestrial observer, the "head" and the "tail" do not overlap correctly for 30 minutes in each day, in the temperate latitudes. To avoid this problem it is necessary to provide at least one additional satellite, i.e. a total of seven satellites in the network.

A concrete example of the orbit parameters for the hypothesis of seven satellites is as follows:

| Satellite | Ascending node | Right anomaly: |
|---|---|---|
| 1 | 120° | 90° |
| 2 | 90° | 180° |
| 3 | 60° | −90° |
| 4 | 30° | 0° |
| 5 | 0° | 90° |
| 6 | −30° | 180° |
| 7 | −60° | −90° |

Figure 7:
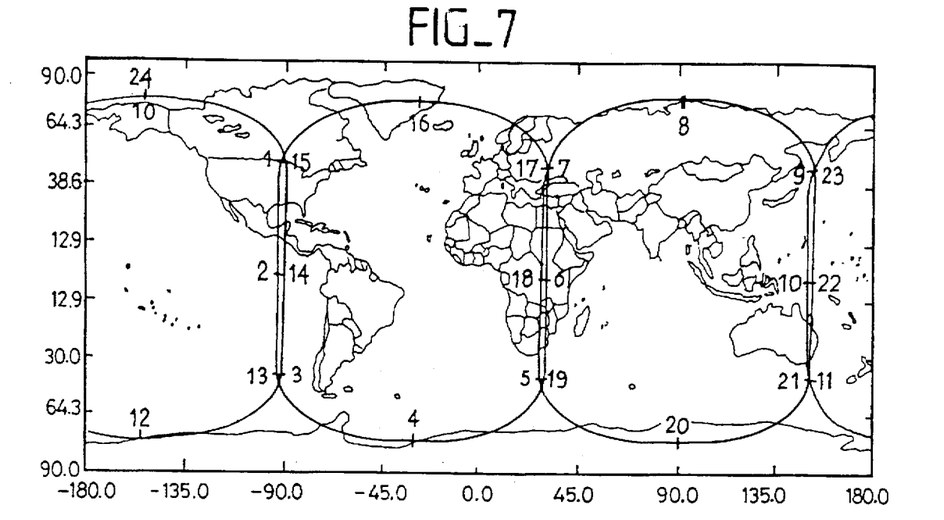
FIG. 7 is a diagram showing the terrestrial coverage of one example of a satellite network of the system of the invention.

FIG. 7 shows the time positions of the satellite on a terrestrial projection (track).

The features of the communication system will now be explained in detail, by means of a preferred embodiment.

Four links are required to guarantee full duplex communication: "terrestrial terminal station √ satellite" and "satellite √ user mobile station", i.e. the "Earth √ space" transmissions. Full duplex communication can be achieved using different frequency bands and different polarizations. As already mentioned, the Ku band could be chosen for the "satellite √ user mobile terminal" link and the Ka band for the "terrestrial terminal station √ satellite" links. Other frequencies may be used, for the example the millimeter band.

The access mode is preferably DS-CDMA (direct sequence-code division multiple access), although the system can use many other techniques. The use of a single pencil beam per user is particularly interesting, at least if the system is not too heavily loaded.

Figure 8:
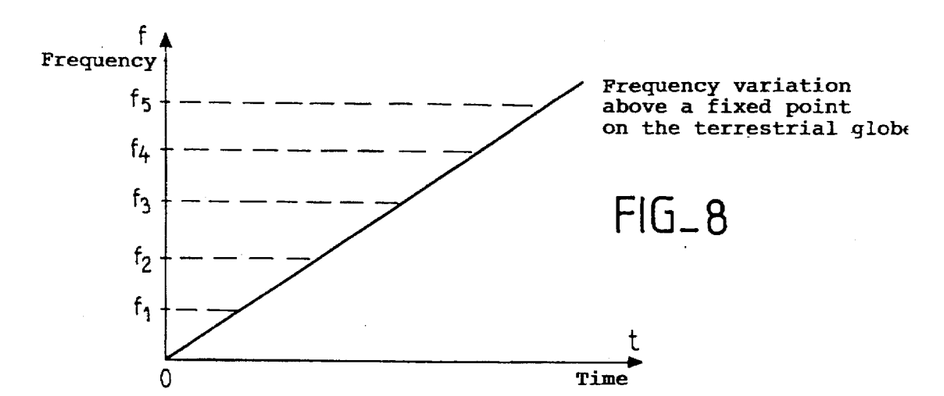
FIG. 8 shows the variation in frequency as a function of time of signals received above a fixed point on the terrestrial globe.

If a frequency scanning antenna is used in the user portable terminal, for example $T_1$ (see FIGS. 1a and 1b), the terminal receives from a high-gain antenna on the satellite (for example $Sat_1$) a signal the frequency of which varies as shown in the FIG. 8 diagram, depending on its position relative to the antenna on the satellite (see FIGS. 1a and 1b, for example). This diagram shows the variation in the frequency of the received signal as a function of time. The time axis is arbitrary in the sense that the start (time 0) represents the time at which the terrestrial station enters the area of visibility of a given satellite (for example $Sat_1$). The other frequencies are attenuated according to the radiation pattern of the antenna of the terminal in question (for example $T_1$). In this way it is possible to divide the coverage area of the satellite (for example $Sat_1$) into virtual pencil beams each characterized by a nominal frequency band and of narrow bandwidth compared to the bandwidth of the system, for which the antenna has a high gain.

The virtual pencil beam is fixed on the surface of the Earth, but the center frequency changes as shown in FIGS. 1a, 1b and 8. In this way, if the terrestrial station (for example $ST_1$) is capable of tracking the frequency variations it is still in the center of the pencil beam and therefore allows a higher gain of the antenna of the satellite (for example $Sat_1$): there are no losses due to gain reduction at the borders of the coverage area.

Since the apparent speed of the satellites across the ground is high (around 5 000 kph), a terrestrial station can "see" a plurality of pencil beams pass by during a given call. The prior art systems require switching between beams but the terrestrial station of the system of the invention continue to "see" the same virtual pencil beam, the frequency of which changes in the manner indicated above. The frequency variation is known in advance. This function is a deterministic function, whether at the transmitter level or the receiver level. In particular, it can be deduced from the coordinates of the station and the time of day. It is therefore sufficient for the transmitter to vary its frequency in accordance with the aforementioned law and for the receiver to vary the frequency of the frequency converter local oscillator in the same manner in order to recover the baseband information.

The mechanism to be adopted requires the ability to track relatively wide frequency variations, typically in the order of 50 kHz/s to 100 kHz/s, if the correct baseband signal is to be obtained at all times. This requirement can be satisfied using present day technology, even for low-cost terminals. Note that only the center frequency is subject to this high level of variation, and this is easier than a conventional Doppler device which also requires changes in the data rate with all the attendant repercussions in respect of synchronization, filtering, etc.

The modulation and filtering techniques adopted in the context of the invention can be the same as those used in prior art terrestrial or satellite CDMA systems.

Another critical problem is raised by non-geostationary satellites and the re-routing of calls, i.e. switching between terrestrial terminal stations. In the prior art satellite systems of the LEO type the apparent speed of the satellites on the terrestrial track is very high and the elevation angle is very low (about 10°), with the result that the coverage area of the satellite is the same for the terrestrial terminal station and for the terrestrial mobile station. Switching between terrestrial terminal stations is easy, in particular if a terrestrial mobile station initiates a call at the border of the coverage area. The satellite links the terrestrial mobile station to the terrestrial terminal station and the latter is connected to a fixed terrestrial communication network. The satellite continues to move around its orbit during the call, leaving the area of visibility of the terrestrial terminal station to enter the area of visibility of the next. In this case, it is necessary to reroute the call channels between terminal stations using a dedicated network via a cable or a satellite link in order to reach the original fixed terrestrial communication network.

On the other hand, in most cases the system of the invention prevents the need for switching between terrestrial terminal stations. In this system, the minimum elevation angle for user mobile stations (for example 25°) is higher than the minimum elevation angle for terrestrial terminal stations (for example 10°), with the result that the area of visibility for the terminal stations from the satellite is comparatively larger. Taking advantage of this, the particular specifications of the satellite orbit and an appropriate location of the terrestrial terminal stations, it is normally not necessary to switch between these stations since it is highly probable that the call will terminate or at least that switching between satellites will occur before the satellite leaves the area of visibility of the terrestrial terminal station.

Thus the problem is essentially reduced to sharing resources between terrestrial terminal stations and a simple configuration of satellites with no switching between terrestrial terminal stations is feasible.

The link balance will now be explained in detail for a preferred embodiment.

The following hypotheses are adopted:

The access mode is the DS-CDMA mode already described, which means that users are distinguished by different codes to obtain bandwidth expansion.

The bit rate of elements is 24.576 MHz.

The processing gain is 64 for a source bit rate of 384 kbit/s and 384 for a source bit rate of 64 kbit/s.

The receiver of the mobile user terminal tracks the main lobe of the antenna by means of frequency scanning.

Figure 9:
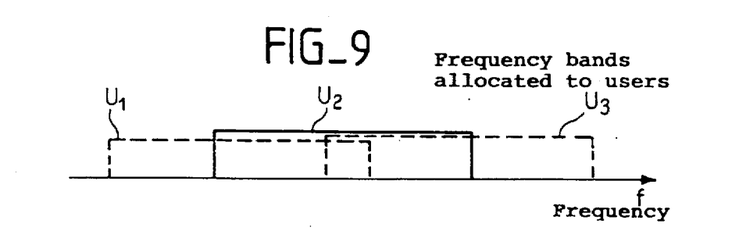
FIG. 9 shows the allocation of frequency bands between users in an embodiment in which the beams are virtual beams.

Because of this latter feature, the various user signals can partially overlap in the same frequency band. This is shown in FIG. 9, which represents three partially overlapping frequency bands allocated to users $U_1$ through $U_3$.

Consequently, in the system of the invention there is no rigid division of the coverage area into pencil beams, since there is no identifiable center frequency. To simplify the calculations a virtual pencil beam is defined as being the area of the surface of the Earth that "sees" the bandwidth of the signal transmitted with a center at the nominal frequency. The user mobile terminal is always at the center of the coverage area of the virtual pencil beam (and the satellite antenna gain is always maximum) but it is not always possible to obtain completely orthogonal spread sequences, even if users remain synchronized in time. However, the situation is more favorable than in conventional asynchronous CDMA type systems since the inherent noise of near users (received via the same onboard power) is rejected because of their quasi-orthogonalities, whereas the inherent noise of distant users (who are therefore largely non-orthogonal) is reduced by the antenna discrimination.

A precise self-interference calculation is very difficult. An extremely unfavorable scenario is assumed based on entirely asynchronous CDMA, which includes a margin for maneuver.

To give a concrete example, tables I through VI at the end of this description set out link balance examples for, respectively:

the terrestrial terminal station → satellite "out" link, the satellite → user mobile terminal "out" link, the global balance for these two links, the user mobile terminal → satellite "return" link, the satellite → terrestrial terminal station "return" link, the global balance for these two links.

Figure 10:
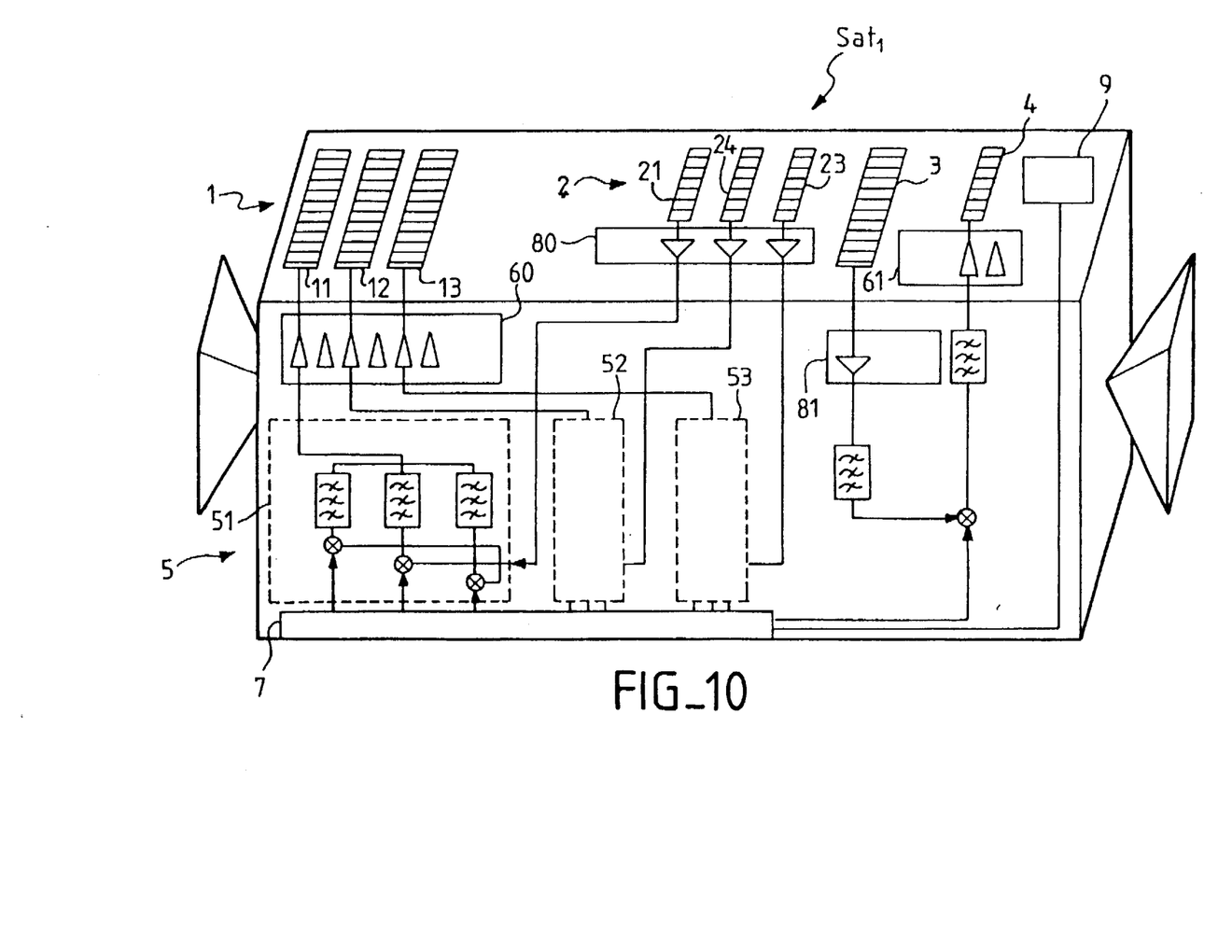
FIG. 10 shows one example of a satellite architecture of the invention.

FIG. 10 is a block diagram showing one possible embodiment of a communication satellite in accordance with the invention.

The satellite, for example $Sat_1$, comprises frequency scanning antennas 1, 2, 3 and 4. The maximum scanning angles are in the order of 35°, both to and from user mobile terminals and to and from terrestrial terminal stations. The "out" link includes two sets of antennas: the Ku band transmit antenna 1 and the Ka band receive antenna. Each set comprises three parallel antennas 11 through 13 and 21 through 23, respectively, each typically covering 35° parallel to the direction of movement of the satellite $Sat_1$ and 12.5° in the orthogonal direction. For example, the antennas 11 through 13 produce the sub-pencil beams $p_{1A}$ through $p_{1C}$ shown in FIG. 3.

There is only one antenna 3, 4 for each "return" link.

The electronics on the satellite $Sat_1$ include a local oscillator 7 distributing frequency signals from its outputs to the usual control and signal processing circuits, in particular a set 5 of intermediate frequency processors 51 through 53 controlling a set of travelling wave tubes 60. The latter feed the antennas 11 through 13. A fourth travelling wave tube 61 feeds the antenna for transmitting to the terrestrial terminal stations. The on board electronics also include low-noise amplifiers 80 and 81 at the outputs of the receive ntennas and a radio beacon 9 the output signals of which are used as a reference by the local oscillator 7. Finally, it comprises various filters and mixers that are usual in this type of application, and which are not identified by specific reference numbers, together with all the other units necessary for correct functioning of the system as a whole: electrical power supplies, etc.

Each Ku band antenna scans individual CDMA communication channels (around 25 MHz) in a direction parallel to the movement of the satellite Sat1 over its global band of 500 MHz. The same bandwidth can be used by the set of three sub-antennas 11 through 13 if the CDMA protocol and the lateral antenna discrimination guarantee sufficient protection against mutual interference.

Each 500 MHz band (in the antennas 11 through 13) is obtained from signals received via the corresponding antennas (21 through 23) in the Ka band (frequency conversion from 2.5 MHz to 500 MHz). The signals are passed to the intermediate frequency processors 51 through 53.

A similar method is adopted for the "return" link, but there is only one receive antenna 3 and one transmit antenna 4.

It should be clear that the invention is not limited to the embodiments previously described with particular reference to FIGS. 1 through 10. For example, the onboard antennas or the user mobile terminal antennas are not restricted to frequency scanning.

The numerical values given (frequency bands, bandwidths, etc) have been given merely as one illustration of the invention and the values actually used depend essentially on the precise application. Finally, many transmission protocols can be used in the context of the invention (CDMA, etc).

TABLE I

Terrestrial terminal station → Satellite "out" link balance

| | | |
|---|---|---|
| Frequency | GHz | 30 |
| Minimum elevation angle | Degrees | 10 |
| Distance | km | 18173 |
| Transmit power | dBW | 22.7 |
| Station peak gain | dBi | 66 |
| EIRP | dBW | 88.7 |
| EIRP per user | dBW | 58.7 |
| Propagation losses | dB | 207.1 |
| Atmosphere losses | dB | 10.5 |
| Satellite antenna gain (three-sector antenna), after Butler matrix BFN | dBi | 24.1 |
| Satellite noise temperature (BFN included) | K | 900 |
| Boltzmann's constant | dBW/K/Hz | −228.6 |
| Noise spectral density | dBW/Hz | −199.1 |
| Bit rate | kHz | 64 |

TABLE I-continued

Terrestrial terminal station → Satellite "out" link balance

| | | |
|---|---|---|
| Bit rate | dBHz | 48.1 |
| "Uplink" Eb/No | dB | 16.1 |
| Minimum angle off satellite axis relative to terrestrial terminal station sighting antenna for acceptable interference | degrees | ≅1 |
| Time period for which satellite is aligned with geostationary satellite arc | minutes | ≅1 |

TABLE II

Satellite → User mobile terminal "out" link balance

| | | |
|---|---|---|
| Frequency | GHz | 12 |
| Minimum elevation | Degrees | 25 |
| Distance | km | 16741 |
| Antenna transmit power | dBW | 19.8 |
| Satellite antenna overall gain (three-sector antenna) after Butler matrix BFN | dBi | 32.1 |
| Total EIRP | dBW | 51.9 |
| EIRP per user | dBW | 21.9 |
| Propagation losses | dB | 198.5 |
| Means atmosphere losses | dB | 1.5 |
| User mobile terminal antenna gain | dBi | 30 |
| Mobile terminal noise temperature | K | 290 |
| Boltzmann's constant | dBW/K/Hz | −228.6 |
| Noise spectral density | dBW/Hz | −204 |
| Bit rate | kHz | 64 |
| Bit rate | dBHz | 48.1 |
| "Downlink" Eb/No | dB | 16.1 |
| Minimum angle off satellite axis relative to geostationary sighting antenna for acceptable interference | degrees | ≅2 |
| Time interval during which satellite is aligned with geostationary satellite arc below "off-axis" angle | minutes | <3 |
| Number of users per satellite | number | 1000 |
| System margin | dB | 1 |

TABLE III

Terrestrial terminal station → User mobile terminal "out" link overall balance

| | | |
|---|---|---|
| Eb/No (global, end-to-end) | dB | 6.2 |
| Eb/(No + Io) (global) | dB | 4.5 |
| System bandwidth | MHz | 520 |
| Processing gain - at 64 kbit/s | | 384 |
| - at 384 kbit/s | | 64 |
| Bit rate of elements | Mbits/s | 24.576 |
| Bit error rate (end-to-end) | | $10^{-10}$ |

TABLE IV

User mobile terminal → Satellite link balance

| | | |
|---|---|---|
| Frequency | GHz | 14 |
| Minimum elevation | Degrees | 25 |
| Distance | km | 16741 |
| Total antenna transmit power | dBW | 3 |
| User mobile terminal antenna gain | dBi | 31 |
| User mobile terminal EIRP | dBW | 34 |

TABLE IV-continued

User mobile terminal → Satellite link balance

| | | |
|---|---|---|
| Propagation losses | dB | 199.8 |
| Maximum co-located users (for interference within system and with geostationary satellites) | number | 24 |
| Atmosphere losses | dB | 3 |
| Satellite antenna gain | dBi | 28.6 |
| Satellite noise temperature | K | 600 |
| Boltzmann's constant | dBW/K/Hz | −228.6 |
| Noise spectral density | dBW/Hz | −200.8 |
| Bit rate | kHz | 64 |
| Bit rate | dBHz | 48.1 |
| "Uplink" Eb/No | dB | 11.5 |
| Minimum angle off geostationary satellite axis relative to a user mobile terminal sighting antenna for acceptable interference | degrees | ≅0.7 |
| Time interval during which satellite is aligned with geostationary satellite arc below "off-axis" angle | minutes | <1 |
| Eb/Io | dB | 9.2 |
| System margin | dB | 1 |

TABLE V

Satellite → Terrestrial terminal station link balance

| | | |
|---|---|---|
| Frequency | GHZ | 20 |
| Minimum elevation | Degrees | 10 |
| Distance | km | 18173 |
| Antenna transmit power | dBW | 10.5 |
| Satellite antenna gain (after BFN) | dBi | 20.1 |
| Satellite EIRP | dBW | 30.6 |
| EIRP per user | dBW | 0.6 |
| Propagation losses | dB | 203.7 |
| Atmosphere losses | dB | 6 |
| Terrestrial terminal station antenna gain | dBi | 61 |
| Terrestrial terminal station noise temperature | K | 290 |
| Boltzmann's constant | dBW/K/Hz | −228.6 |
| Noise spectral density | dBW/Hz | −204 |
| Bit rate | kHz | 64 |
| Bit rate | dBHz | 48.1 |
| "Downlink" Eb/No | dB | 7.8 |
| Minimum angle off axis of satellite relative to fixed terrestrial station antenna for sighting a geostationary satellite for acceptable interference | degrees | <1 |
| Time interval during which satellite is aligned with geostationary satellite arc below minimum "off-axis" angle | minutes | <1 |
| Number of users per satellite | number | 1000 |

TABLE VI

User mobile terminal → Terrestrial terminal station "return" link overall balance

| | | |
|---|---|---|
| Eb/No (global, end-to-end) | dB | 6.2 |
| Eb/(No + Io) (global) | dB | 4.5 |
| System bandwidth | MHz | 520 |
| Processing gain - at 64 kbit/s | | 384 |
| - at 384 kbit/s | | 64 |
| Bit rate of elements | Mbits/s | 24.576 |
| Bit error rate (end-to-end) | | $10^{-10}$ |

There is claimed:

1. Method of transmitting radio signals via a satellite network between at least one fixed terrestrial station and user terminals, wherein the satellite network comprises a plurality of satellites rotating about a terrestrial globe in a circular orbit and at a particular rotation speed, wherein the orbits are inclined to an equator and have a radius less than that of geostationary orbits, wherein the satellites are triply geosynchronous, and wherein each satellite comprises an arrangement of antennas for generating at least one beam with a radiation pattern directed towards a surface of the terrestrial globe and associated with a frequency band of frequencies of particular bandwidth, the method comprising at least the following steps:

dividing said beam into a particular number of contiguous pencil beams, wherein said each of said pencil beams is associated with a frequency sub-band and wherein said frequency sub-band is a subdivision of said particular bandwidth;

setting up a communication link in at least one direction between said one fixed terrestrial terminal station and a first user terminal of said user terminals via a first satellite of said satellite network, wherein a first portion of said communication link between said first satellite and said first user terminal is set up by using an instantaneous transmission frequency in a first frequency sub-band associated with a first pencil beam which illuminates said first user terminal when said first satellite flies over said first user terminal and wherein a second portion of said communication link is set up between said first satellite and said one fixed terrestrial terminal station; and progressively shifting said transmission frequency during a period of the first portion of said communication link towards a second frequency sub-band associated with an adjacent pencil beam and at a rate proportional to said particular rotation speed so as to compensate said rotation and to enable tracking of said satellite.

2. Method according to claim 1, wherein said frequency sub-bands have equal width and said frequency sub-bands form a continuous spectrum so that contiguous pencil beams are associated with contiguous frequency sub-bands evolving in a particular direction.

3. Method according to claim 2, wherein, in said frequency shifting step, said instantaneous transmission frequency jumps from an initial frequency in said first frequency sub-band to a final frequency in the second frequency sub-band associated with said adjacent pencil beam so as to achieve switching between pencil beams without blocking.

4. Method according to claim 2, wherein said frequency sub-bands associated with said pencil beams of said first satellite are in an opposite direction from frequency sub-bands associated with pencil beams of a second satellite so that when a last pencil beam of a first satellite associated with a particular freauency sub-band ceases to illuminate said first user terminal, the first user terminal is illuminated by a first pencil beam of the second satellite and wherein said first pencil beam of the second satellite is associated with said particular frequency sub-band so as to achieve switching between satellites without blocking.

5. Method according to claim 4, wherein footprints of said last pencil beam of said first satellite and said first pencil beam of said second satellite at least partially overlap at the surface of the terrestrial globe so that switching between satellites is progressive.

6. Method according to claim 1, wherein said pencil beams are highly elliptical and each have a major axis which is orthogonal to a direction of movement of the first satellite of said satellite network illuminating said user terminals during a call.

7. Method according to claim 6, wherein each pencil beam is divided into a particular number of sub-pencil beams.

8. Method according to claim 1, wherein said communication link is a full duplex link and in that "out" and "return" transmissions have mutually orthogonal crossed polarizations.

9. Method according to claim 1, wherein a frequency-division multiple access protocol is used to distinguish between said pencil beams and a direct sequence code-division multiple access protocol is used to distinguish data within said pencil beams.

10. Method according to claim 1, wherein pencil beams from said satellites of said satellite network illuminating an area of the terrestrial globe between two latitudes of a particular value on either side of the equator of said terrestrial globe are momentarily interrupted in order to prevent interference with geostationary satellite systems operating in transmission frequency bands including said instantaneous transmission frequency.

11. Method according to claim 10, wherein said area of said terrestrial globe is located between +9° latitude and −9° latitude.

12. A method of transmitting radio signals between a first user terminal and a satellite network comprising a first satellite which rotates around a terrestrial body at a particular rotation speed, the method comprising the steps of:

(a) dividing a frequency beam generated by said satellite into a predetermined number of contiguous pencil beams, wherein said frequency beam is associated with a frequency band having a particular bandwidth, wherein said pencil beams are respectively associated with frequency sub-bands, and wherein said frequency sub-bands respectively relate to subdivisions of said particular bandwidth;

(b) setting up a communication link between said first user terminal and said first satellite by using an instantaneous transmission frequency in a first frequency sub-band associated with a first pencil beam which illuminates said first user terminal when said first satellite flies over said first user terminal; and (c) progressively shifting said instantaneous transmission frequency during a period of the communication link towards a second frequency sub-band associated with an adjacent pencil beam, wherein said instantaneous transmission frequency is shifted at a rate proportional to said particular rotation speed of said first satellite.

13. The method according to claim 12, wherein said frequency sub-bands form a continuous spectrum so that contiguous pencil beams are associated with contiguous frequency sub-bands evolving in a particular direction.

14. The method according to claim 13, wherein said step (c) comprises the step of:

(c1) shifting said instantaneous transmission frequency from an initial frequency in said first frequency sub-band to a final frequency in the second frequency sub-band associated with said adjacent pencil beam so as to achieve switching between said first pencil beam and said adjacent pencil beam without blocking.

15. The method according to claim 13, wherein said frequency sub-bands associated with said pencil beams of said first satellite are arranged in an opposite direction from frequency sub-bands associated with pencil beams of a second satellite in said satellite network, wherein a last pencil beam of said first satellite and a first pencil beam of said second satellite are both associated with a particular frequency sub-band, and wherein said last pencil beam of said first satellite and said first pencil beam of said second satellite illuminate said first user terminal so as to achieve switching between satellites without blocking.

16. The method according to claim 15, wherein footprints of said last pencil beam of said first satellite and said first pencil beam of said second satellite at least partially overlap at a surface of the terrestrial body so that switching between satellites is progressive.

17. A system comprising a satellite network, at least one fixed terrestrial station, and user terminals, for transmitting radio signals via said satellite network between said at least one fixed terrestrial station and said user terminals, wherein the satellite network comprises a plurality of satellites rotating about a terrestrial globe in a circular orbit and at a particular rotation speed, wherein the orbits are inclined to an equator and have a radius less than that of geostationary orbits, wherein the satellites are triply geosynchronous, and wherein each satellite comprises an arrangement of antennas for generating at least one beam with a radiation pattern directed towards a surface of the terrestrial globe and associated with a frequency band of frequencies of particular bandwidth, the system comprising:

means for dividing said beam into a particular number of contiguous pencil beams, wherein said each of said pencil beams is associated with a frequency sub-band and wherein said frequency sub-band is a subdivision of said particular bandwidth;

means for setting up a communication link in at least one direction between said one fixed terrestrial terminal station and a first user terminal of said user terminals via a first satellite of said satellite network, wherein a first portion of said communication link between said first satellite and said first user terminal is set up by using an instantaneous transmission frequency in a first frequency sub-band associated with a first pencil beam which illuminates said first user terminal when said first satellite flies over said first user terminal and wherein a second portion of said communication link is set up between said first satellite and said one fixed terrestrial terminal station; and means for progressively shifting said transmission frequency during a period of the first portion of said communication link towards a second frequency sub-band associated with an adjacent pencil beam and at a rate proportional to said particular rotation speed so as to compensate said rotation and to enable tracking of said satellite.

18. The system according to claim 17, wherein said first satellite and said first user terminal comprise scanning antennas for providing said communication link.

19. The system according to claim 17, wherein said satellites and said user terminals comprise scanning antennas for establishing communication paths for said radio signals.

20. The system according to claim 17, wherein said antennas are of the frequency scanning type.

21. The system according to claim 20, wherein each of said pencil beams are divided into a particular number of sub-pencil beams, wherein said satellites each comprise a first set of N transmit antennas and a second set of N receive antennas for "out" and "return" communication links between said satellites and said user terminals, wherein N equals said particular number, wherein each transmit and receive antenna is associated with one of said sub-pencil beams, wherein each satellite further comprises an additional transmit antenna and an additional receive antenna for "out" and "return" communication links between said satellites and said at least one terrestrial terminal stations, and wherein said transmit antennas, said receive antennas, said additional transmit antenna, and said additional receive antennas are frequency scanning antennas.

22. The system according to claim 20, wherein said user terminals are provided with deployable antennas which have an active state and a passive state, wherein said antennas are deployed and communication links can be provided during said active state, wherein said antennas are folded up and the user terminals only can be called during said passive state, and wherein said antennas are frequency scanning antennas.

* * * * *